United States Patent
Chen et al.

(10) Patent No.: US 7,200,164 B2
(45) Date of Patent: Apr. 3, 2007

(54) PACKET-BASED MULTIPLICATION-FREE CCK DEMODULATOR WITH A FAST MULTIPATH INTERFERENCE CIPHER

(75) Inventors: Jeng-Hong Chen, Temple City, CA (US); Wei-Chung Peng, Rancho Palos Verdes, CA (US)

(73) Assignee: Winbond Electronics Corp., Hsinchu (TW)

( * ) Notice: Subject to any disclaimer, the term of this patent is extended or adjusted under 35 U.S.C. 154(b) by 803 days.

(21) Appl. No.: 10/289,749

(22) Filed: Nov. 7, 2002

(65) Prior Publication Data

US 2004/0091023 A1    May 13, 2004

(51) Int. Cl.
*H04B 1/69* (2006.01)
(52) U.S. Cl. ............... 375/148; 375/140; 375/143; 375/144; 375/152
(58) Field of Classification Search ............... 370/208, 370/209; 375/142, 143, 148, 233, 152, 144, 375/232, 329, 346; 455/232.1
See application file for complete search history.

(56) References Cited

U.S. PATENT DOCUMENTS 5,513,215 A * 4/1996 Marchetto et al. .......... 375/233
5,623,511 A * 4/1997 Bar-David et al. .......... 375/143
6,233,273 B1 * 5/2001 Webster et al. ............. 375/148
6,324,160 B1 * 11/2001 Martin et al. ............... 370/209
2002/0042256 A1 * 4/2002 Baldwin et al. ......... 455/232.1
2002/0122466 A1 * 9/2002 Somayazulu ................ 375/142

OTHER PUBLICATIONS

X. Qing et al; Reduced-complexity multipath interference cancellation technique; Sep. 24-28, 2002; pp. 1735-1738; VTC 2002.*

* cited by examiner

*Primary Examiner*—Jay K. Patel
*Assistant Examiner*—Adolf DSouza
(74) *Attorney, Agent, or Firm*—Birch, Stewart, Kolasch & Birch, LLP

(57) ABSTRACT

A complementary code keying (CCK) demodulator used in a RAKE receiver receiving CCK symbols in a multipath environment computes multipath interferences (MPIs) required for canceling intra-codeword chip interference (ICI). The algorithmic structure jointly computes the ICI of a plurality of possible codewords. The algorithmic structure is similar to the optimal architecture required for CCK correlation computations. The similarity between these two structures allows for the use of the same hardware at different times to compute MPIs and to compute the CCK correlation of a plurality of possible codewords.

5 Claims, 14 Drawing Sheets

FIG. 14

Table I. Outputs of a MPI Mapper

| Mapper I from 64 MPI | Mapper II from 32 MPI | Mapper III from 16 MPI |
|---|---|---|
| $Y_1 = C_1$ | $Y_1 = C_1$ | $Y_1 = -C_1$ |
| $Y_2 = C_2$ | $Y_2 = C_2$ | $Y_2 = -C_2$ |
| $Y_3 = C_3$ | $Y_3 = C_3$ | $Y_3 = C_1$ |
| $Y_4 = C_4$ | $Y_4 = C_4$ | $Y_4 = -C_2$ |
| $Y_5 = C_{17}$ | $Y_5 = C_{17}$ | $Y_5 = C_{17}$ |
| $Y_6 = C_{18}$ | $Y_6 = C_{18}$ | $Y_6 = C_{18}$ |
| $Y_7 = C_{19}$ | $Y_7 = C_{19}$ | $Y_7 = -C_{17}$ |
| $Y_8 = C_{20}$ | $Y_8 = C_{20}$ | $Y_8 = -C_{18}$ |
| $Y_9 = C_{33}$ | $Y_9 = C_{33}$ | $Y_9 = C_{33}$ |
| $Y_{10} = C_{34}$ | $Y_{10} = C_{34}$ | $Y_{10} = C_{34}$ |
| $Y_{11} = C_{35}$ | $Y_{11} = C_{35}$ | $Y_{11} = -C_{33}$ |
| $Y_{12} = C_{36}$ | $Y_{12} = C_{36}$ | $Y_{12} = -C_{34}$ |
| $Y_{13} = C_{49}$ | $Y_{13} = C_{49}$ | $Y_{13} = C_{49}$ |
| $Y_{14} = C_{50}$ | $Y_{14} = C_{50}$ | $Y_{14} = C_{50}$ |
| $Y_{15} = C_{51}$ | $Y_{15} = C_{51}$ | $Y_{15} = -C_{49}$ |
| $Y_{16} = C_{52}$ | $Y_{16} = C_{52}$ | $Y_{16} = -C_{50}$ |
| $Y_{17} = C_5$ | $Y_{17} = C_5$ | $Y_{17} = C_5$ |
| $Y_{18} = C_6$ | $Y_{18} = C_6$ | $Y_{18} = C_6$ |
| $Y_{19} = C_7$ | $Y_{19} = C_7$ | $Y_{19} = -C_5$ |
| $Y_{20} = C_8$ | $Y_{20} = C_8$ | $Y_{20} = -C_6$ |
| $Y_{21} = C_{21}$ | $Y_{21} = C_{21}$ | $Y_{21} = C_{21}$ |
| $Y_{22} = C_{22}$ | $Y_{22} = C_{22}$ | $Y_{22} = C_{22}$ |
| $Y_{23} = C_{23}$ | $Y_{23} = C_{23}$ | $Y_{23} = -C_{21}$ |
| $Y_{24} = C_{24}$ | $Y_{24} = C_{24}$ | $Y_{24} = -C_{22}$ |
| $Y_{25} = C_{37}$ | $Y_{25} = C_{37}$ | $Y_{25} = C_{37}$ |
| $Y_{26} = C_{38}$ | $Y_{26} = C_{38}$ | $Y_{26} = C_{38}$ |
| $Y_{27} = C_{39}$ | $Y_{27} = C_{39}$ | $Y_{27} = -C_{37}$ |
| $Y_{28} = C_{40}$ | $Y_{28} = C_{40}$ | $Y_{28} = -C_{38}$ |
| $Y_{29} = C_{53}$ | $Y_{29} = C_{53}$ | $Y_{29} = C_{53}$ |
| $Y_{30} = C_{54}$ | $Y_{30} = C_{54}$ | $Y_{30} = C_{54}$ |
| $Y_{31} = C_{55}$ | $Y_{31} = C_{55}$ | $Y_{31} = -C_{53}$ |
| $Y_{32} = C_{56}$ | $Y_{32} = C_{56}$ | $Y_{32} = -C_{54}$ |
| $Y_{33} = C_9$ | | $Y_{33} = -C_1$ |
| $Y_{34} = C_{10}$ | | $Y_{34} = -C_2$ |
| $Y_{35} = C_{11}$ | | $Y_{35} = C_1$ |
| $Y_{36} = C_{12}$ | | $Y_{36} = C_2$ |
| $Y_{37} = C_{25}$ | | $Y_{37} = -C_{17}$ |
| $Y_{38} = C_{26}$ | | $Y_{38} = -C_{18}$ |
| $Y_{39} = C_{27}$ | | $Y_{39} = C_{17}$ |
| $Y_{40} = C_{28}$ | | $Y_{40} = C_{18}$ |
| $Y_{41} = C_{41}$ | | $Y_{41} = -C_{33}$ |
| $Y_{42} = C_{42}$ | | $Y_{42} = -C_{34}$ |
| $Y_{43} = C_{43}$ | | $Y_{43} = C_{33}$ |
| $Y_{44} = C_{44}$ | | $Y_{44} = C_{34}$ |
| $Y_{45} = C_{57}$ | | $Y_{45} = -C_{49}$ |
| $Y_{46} = C_{58}$ | | $Y_{46} = -C_{50}$ |
| $Y_{47} = C_{59}$ | | $Y_{47} = C_{49}$ |
| $Y_{48} = C_{60}$ | | $Y_{48} = C_{50}$ |
| $Y_{49} = C_{13}$ | | $Y_{49} = C_5$ |
| $Y_{50} = C_{14}$ | | $Y_{50} = C_6$ |
| $Y_{51} = C_{15}$ | | $Y_{51} = -C_5$ |
| $Y_{52} = C_{16}$ | | $Y_{52} = -C_6$ |
| $Y_{53} = C_{29}$ | | $Y_{53} = -C_{21}$ |
| $Y_{54} = C_{30}$ | | $Y_{54} = -C_{22}$ |
| $Y_{55} = C_{31}$ | | $Y_{55} = C_{21}$ |
| $Y_{56} = C_{32}$ | | $Y_{56} = C_{22}$ |
| $Y_{57} = C_{45}$ | | $Y_{57} = -C_{37}$ |
| $Y_{58} = C_{46}$ | | $Y_{58} = -C_{38}$ |
| $Y_{59} = C_{47}$ | | $Y_{59} = C_{37}$ |
| $Y_{60} = C_{48}$ | | $Y_{60} = C_{38}$ |
| $Y_{61} = C_{61}$ | | $Y_{61} = -C_{53}$ |
| $Y_{62} = C_{62}$ | | $Y_{62} = -C_{54}$ |
| $Y_{63} = C_{63}$ | | $Y_{63} = C_{53}$ |
| $Y_{64} = C_{64}$ | | $Y_{64} = C_{54}$ |

PACKET-BASED MULTIPLICATION-FREE CCK DEMODULATOR WITH A FAST MULTIPATH INTERFERENCE CIPHER

BACKGROUND OF THE INVENTION

1. Field of the Invention

The present invention relates to wireless communication systems, such as but not limited to wireless local area networks (WLANs), and in particular, to an 802.11b receiver that contains a packet-based multiplication-free CCK demodulator with a Fast Multipath Interference Cipher (FMIC).

2. Description of the Prior Art

U.S. patent application Publication No. US 2001/0036223 to Webster et al. ("Webster") discloses a RAKE receiver that is used for indoor multipath WLAN applications on direct spread spectrum signals having relatively short codeword lengths. The RAKE receiver has an embedded decision feedback equalizer structure in the signal processing path through the receiver's channel matched filter and codeword correlator. The decision feedback equalizer serves to cancel inter-codeword interference (also known as Inter-Symbol Interference, ISI) (i.e., bleed-over between CCK codewords).

FIGS. 12–14 of Webster illustrate an Intra-codeword Chip Interference (ICI) canceller which is designed to cancel the ICI generated from the post-cursors through the use of lengthy complex operations (multiplications and additions), including one DFE convolution block and one codeword correlation block for each and every codeword (up to 256 codewords in total), in a 802.11b CCK Decoder. Each of the 64 or 256 ICI outputs is calculated independently from a separate processing path.

In FIG. 12 of Webster, for each and every codeword (256 codewords in total), three basic building blocks are required: (i) one DFE convolution block 1220 which calculates chip-by-chip representation of the ICI before the codeword correlator 1230 using the complex convolution between each codeword (8 complex chips denoted as OW#k CHIP) and up to 8 complex DFE taps, (ii) one chip-by-chip subtractor 1210 which subtracts each of the 8 received complex chips (block 1203) from the outputs of block 1220, and (iii) one codeword correlator 1230 which calculates the correlation between each codeword (8 complex chips) and the results (8 complex chips) from the subtractor 1210. All these operations are complex and are required for each codeword. In short, 256 ICI bias outputs 1212 are calculated independently at blocks 1220, subtracted in parallel at blocks 1210, and then 256 correlations outputs are found from the codeword correlators 1230. Because the input 1223 to each codeword correlator 1230 is now different after the ICI bias correction, this architecture prevents a fast Walsh transform implementation to jointly and effectively calculate the CCK correlations for all CCK codewords.

In another embodiment illustrated in FIG. 13 of Webster, for each and every codeword (64 codewords in total), two basic building blocks (which have the same functions described above) are required: (i) one DFE convolution block 1340 and (ii) one codeword correlator 1330. The number of DFE blocks and correlation blocks required is simplified from 256 to 64. The 64 ICI outputs of blocks 1330 are expanded into 256 ICI outputs from complex operations. Compared to FIG. 12, this architecture calculates the ICI bias for post-CCK codeword correlator correction 1360. Therefore, a codeword correlator to jointly and effectively compute CCK correlations can be effectively implemented using a 64 element fast Walsh transform 1320 and a 1 to 4 expansion 1350. However, each of the 64 post-correlation ICI bias is first calculated using complex convolution 1340 and complex correlation 1330. A 1 to 4 expansion 1330 is then used to generate all 256 post-correlation ICI bias These post-correlation ICI bias are then subtracted from the corresponding 256 correlator outputs of block 1350. To implement this receiver architecture, 64 complex convolution 1340 and complex codeword correlator 1330 need to be performed independently.

In yet another embodiment in FIG. 14 of Webster, for each and every codeword (256 codewords in total), two basic building blocks (which have the same functions described above) are also required: (i) one DFE convolution block 1440 and (ii) one complex codeword correlator 1430. Webster states the fact that the DFE taps can be pre-calculated and pre-stored. Again, the 256 ICI outputs are calculated independently at blocks 1440, and then 256 correlations are found at the outputs of block 1430.

In summary, Webster's architecture requires significant hardware complexity and the execution of large numbers of complex operations (complex multiplications and additions that are required for complex convolution and complex correlation). As a result, large power consumption, complex hardware, and long processing times will be required to implement the embodiments described in FIGS. 12–14 of Webster.

SUMMARY OF THE DISCLOSURE

It is an object of the present invention to provide a CCK receiver which utilizes a reduced number of complex operations.

It is another object of the present invention to simplify the hardware for a CCK receiver.

In order to accomplish the objects of the present invention, the present invention provides an optimal algorithmic structure for use in a RAKE receiver to compute multipath interferences (MPIs) required for canceling intra-codeword chip interference (ICI). The algorithmic structure jointly computes the ICI of a plurality of possible codewords. This algorithmic structure is similar to the optimal architecture required for CCK correlation computations. Therefore, the present invention takes advantage of this similarity between these two structures and uses the same hardware at different times to compute MPIs and to compute the CCK correlation of a plurality of possible codewords.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 14 is a table illustrating the inputs and outputs of the Mappers used in FIGS. 10–12.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices, components, mechanisms and methods are omitted so as to not obscure the description of the present invention with unnecessary detail.

Figure 1:
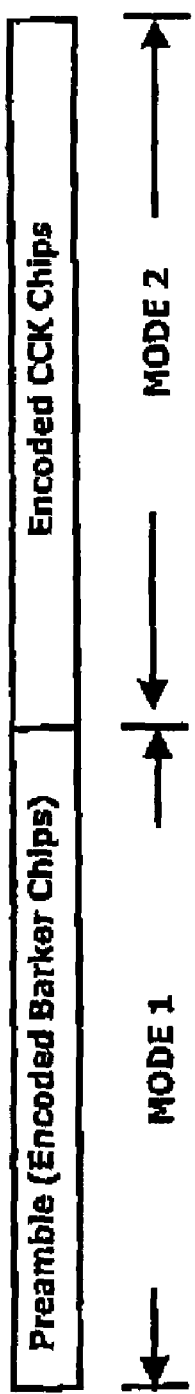
FIG. 1 illustrates a simplified 802.11b packet format of the prior art.

A simplified 802.11b Packet format is shown in FIG. 1 and contains two modes of operation. The preamble of a packet (Mode 1) is Barker-code encoded and the data portion (Mode 2) is modulated in Complementary Code Keying (CCK) to provide encoded CCK chips. Since the two modes are not operating at the same time, the hardware can be shared in Modes 1 and 2 to reduce hardware complexity.

Figure 2:
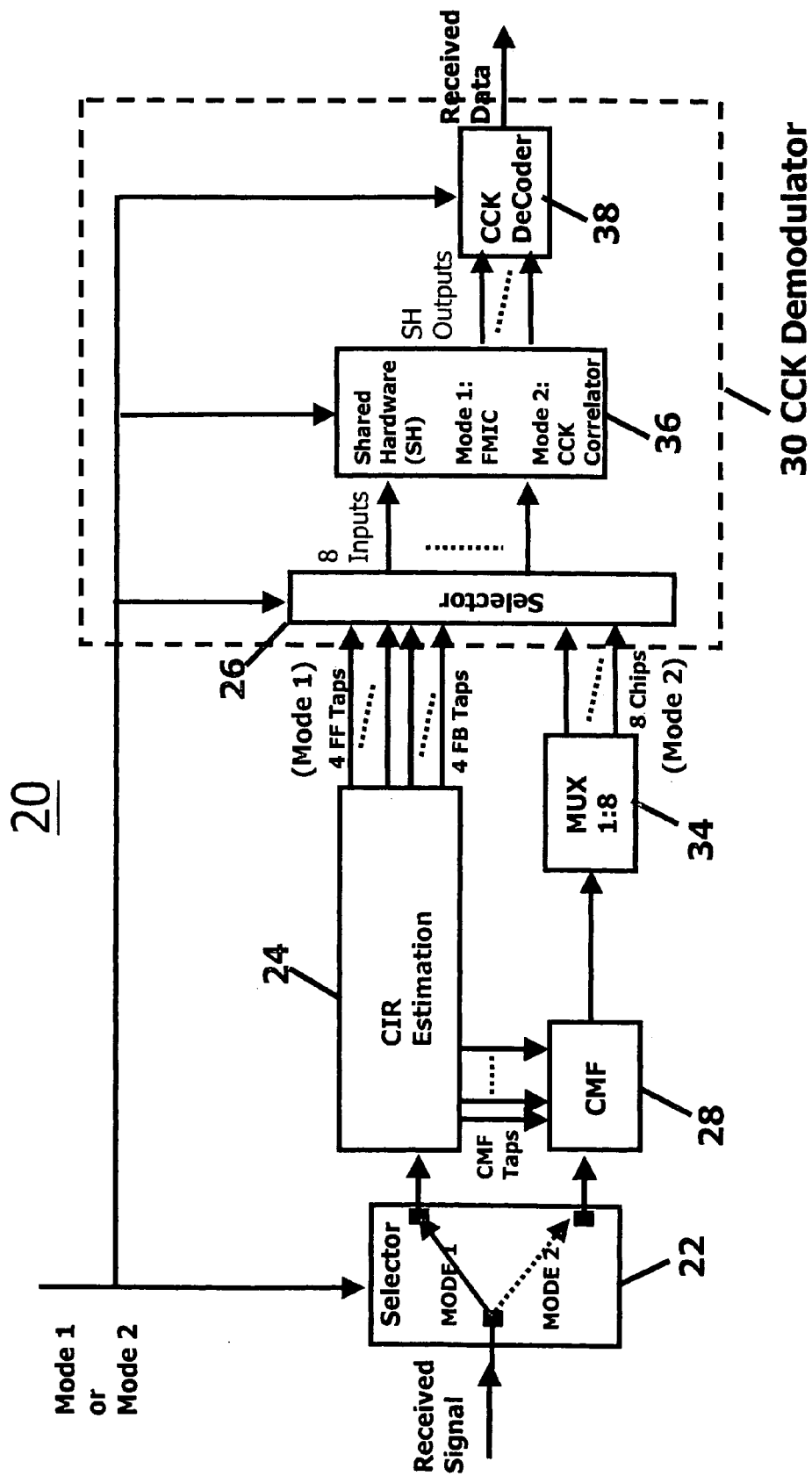
FIG. 2 illustrates a complete receiver which includes one embodiment of the present invention as a CCK Demodulator (block 30).

A receiver 20 is illustrated in FIG. 2. An 802.11b transmitter transmits a data packet at a time for a receiver 20 to process. When a CCK modulated packet is transmitted, each 8 data bits is CCK encoded to 8 complex chips (called one CCK symbol) that are transmitted sequentially on a chip-by-chip basis by the 802.11b transmitter. This signal travels through a wireless channel and arrives at an 802.11 receiver such as receiver 20. A typical wireless channel is characterized by multipath propagation which distorts the received signal. Thus, it is important to implement a cost-effective and performance-effective receiver to mitigate the multipath distortion. The receiver 20 has a first selector 22 which routes a received signal to one of two paths. The first selector 22 connects the first path (Mode 1) during preamble processing and connects the second path (Mode 2) when decoding the received CCK symbols.

The receiver 20 has a CIR (channel impulse response) estimation block 24 having inputs coupled to the first selector 22, first set of outputs coupled to a Channel Matched Filter (CMF) block 28 (which has another set of inputs coupled to the first selector 22, and output coupled to a multiplexer block 34), and a second set of outputs coupled to the second selector block 26. The multiplexer 34 (MUX) has inputs coupled to the CMF block 28 and outputs coupled to the second selector 26. A Shared Hardware (SH) block 36 has inputs coupled to the second selector 26 and outputs coupled to a CCK Decoder 38. As described below, the SH block 36 can be either a Fast-Multipath-Interference-Cipher (FMIC) block 36a or a CCK Correlator 36b, depending on the Mode of operation. The output of the CCK Decoder 36 is provided to an input of a CCK remodulation (Remod) block 32, which has outputs coupled to the DFE block 30. The Mode 1 and Mode 2 signals are provided to the selectors 22, 26, the SH block 36, and the CCK Decoder 38. During Mode 1 operation, the second selector 26 routes the 8 inputs from the CIR Estimation block 24 to the SH block 36. During Mode 2 operation, the second selector 26 routes the 8 inputs from the MUX 34 to the SH block 36. The details of the operations will be described below. The output of the CCK Decoder 38 is an 8-bit index of the decoded CCK codeword. This index also represents the 8-bit decoded data.

Figure 10:
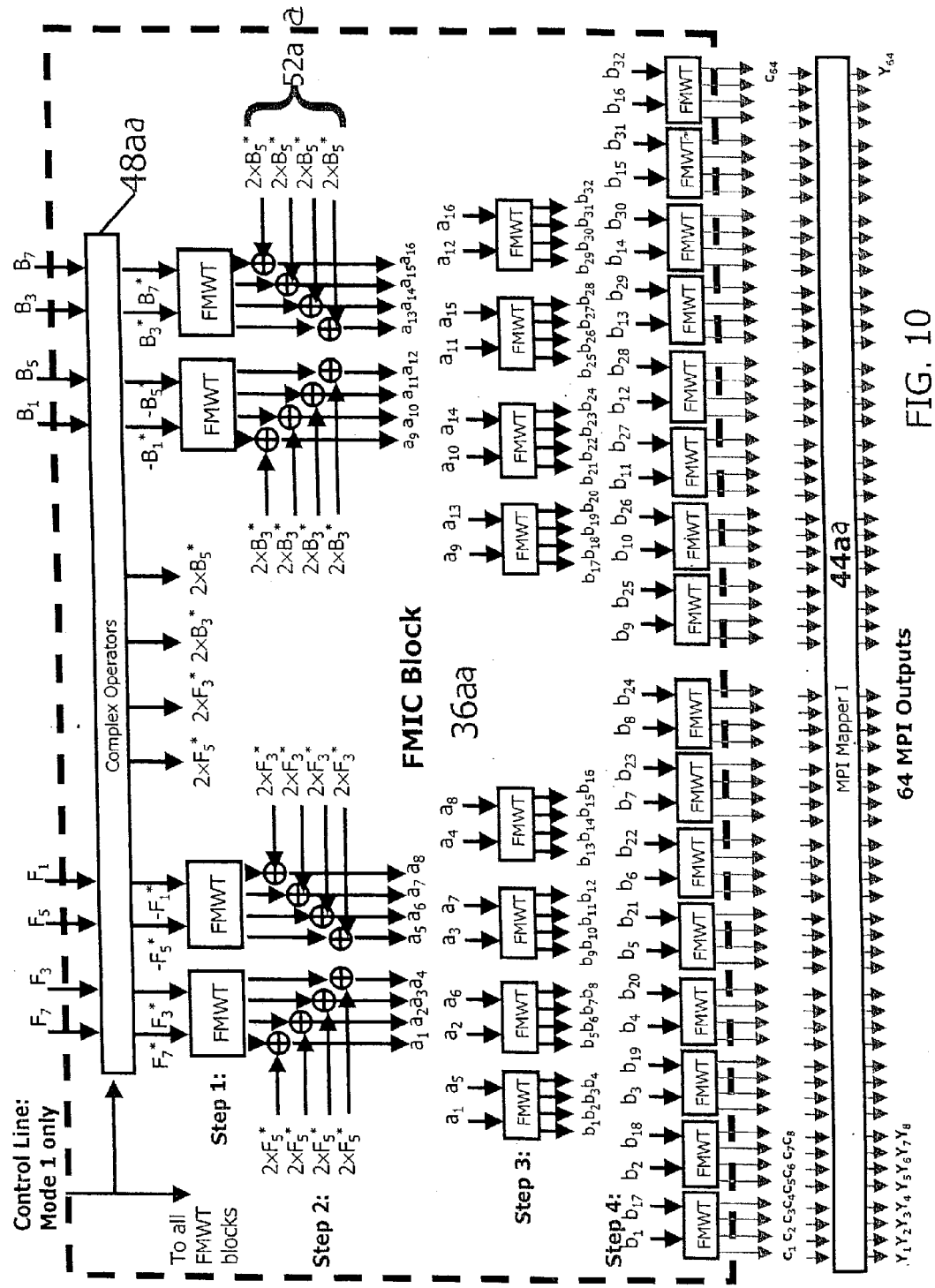
FIG. 10 illustrates one embodiment of an FMIC block of FIG. 4.

Although it is not shown in FIG. 2, one can, for example refer to Webster FIG. 10 and insert a DFE block in between the CMF block 28 and the multiplexer block 34 to cancel the inter-codeword interference (or ISI).

In FIG. 2, the second selector block 26, shared hardware block 36, and CCK decoder block 38 are further enclosed in a CCK Demodulator block 30, an embodiment of the present invention as will be explained in details below.

Figure 3:
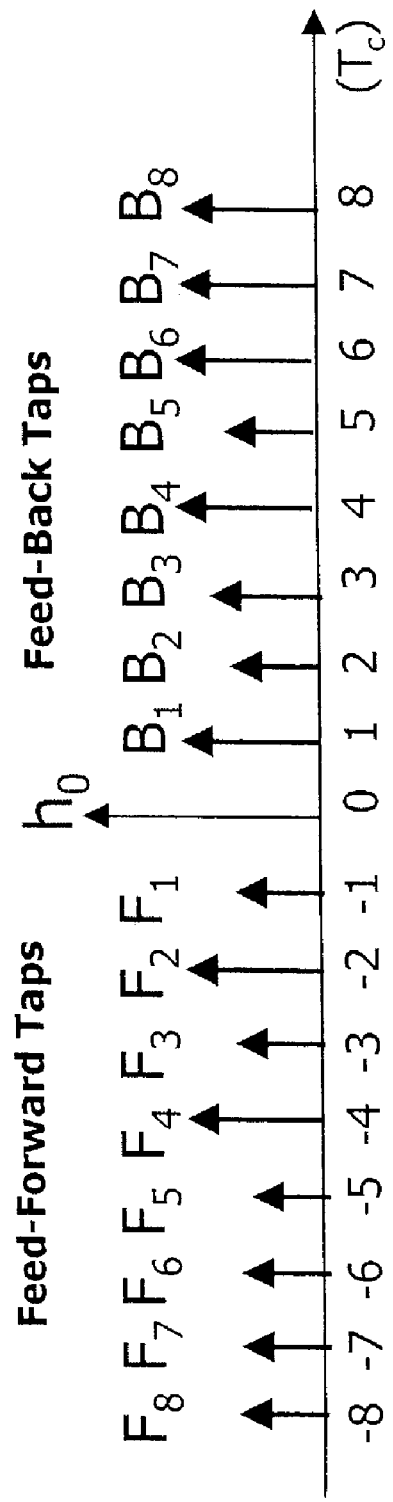
FIG. 3 illustrates an example of Channel Impulse Estimation (CIR) results.

The CIR Estimation block 24 works in Mode 1 during preamble processing for each packet. During the Mode 1 operation, the CIR estimation block 24 (1) uses Barker code correlation to determine an estimated channel impulse response (CIR), and (2) uses the estimated CIR to generate the corresponding CMF taps as outputs for the CMF block 28 to use in Mode 2 and (3) synthesizes the feedback (FB) and feed-forward (FF) taps as outputs for the Selector block 26. Let $h_{CIR}(n)$, where (n=j, −j+1, . . . , 0, . . . ,m), denote the estimated CIR, where n=0 being the tap with the maximum power and $h_{CMF}(n)$ denote the complex-valued CMF taps, then $$h_{CMF}(n) = h_{CIR}*(-n),$$

where ( )* denotes complex conjugate. One can then derive the multipath profile, $h_{MP}(n)$;

$$h_{MP}(n) = h_{CIR}(n) * h_{CMF}(n),$$

wherein ( )*( ) denotes convolution. The FB taps, $B_k = h_{MP}(k)$, where k>0. The FF taps, $F_k$'s, are the taps which precede the main tap $h_{MP}(0)$, i.e., $F_k = h_{MP}(-k)$, where k>0. For ICI cancellations, these FB and FF taps represent an estimate of the joint effect of the multipath channel (via an estimated CIR) and the CMF. For convenience, we will, hereafter, refer to the FF and FB taps as multipath profile. FIG. 3 shows an example multipath profile. The outputs of the CIR estimation 24 are the Feedback (FB) and Feed-forward (FF) tap weights corresponding to the post- and pre-cursor parts of a multipath profile. The CIR Estimation block 24 works in Mode 1 during preamble processing for each packet. During Mode 1 operations, the SH block 36 (in Mode 1, it is the FMIC block 36a) uses these FB and FF taps as inputs to jointly and effectively calculate 64 (or 32, or 16, or 8) Multipath Interferences (MPIs). An innovative architecture for the computation of the MPIs will be shown later. It will also be shown that this new architecture to compute MPIs actually requires essentially no additional hardware.

The MPIs provided by the FMIC block 36a is a post-correlation representation of the Intra-codeword Chip Interference (ICI) due to the currently received CCK symbol (8 chips long). The multipath profile is assumed to be unchanged during a packet period. Therefore, the MPIs are calculated only once for each packet in Mode 1. These MPIs will be used later in Mode 2 when the CCK Decoder 38 cancels out the effect of the ICI by subtracting the corresponding MPI values from its correlator outputs. The same hardware that is used to implement the FMIC operation in Mode 1 is used to implement the CCK Correlator block 36b in Mode 2. In other words, the same hardware is "shared", or used to perform two different functions at two different times.

During Mode 2 operation, the Channel Estimation block 24 provides the CMF tap weights for the CMF block 28 to coherently combine the energy of the received signal through a multipath channel. The DFE block 30 uses the FB tap weights from CIR Estimation block 24 to cancel the ICI from the previous CCK symbol. The previous symbol was decoded in the CCK decoder block 38 and was re-modulated by the CCK Remod block 32.

The MUX 34 groups every eight complex chips (one CCK symbol) after the CMF block 28. The second selector 26 then routes the outputs from MUX 34 to the SH block 36. The SH block 36 operates as a CCK Correlator 36b during Mode 2. Finally, the CCK Decoder 38 is utilized to find an index of a CCK codeword having the maximum correlation between the received signal (represented by 8 received chips) and all possible CCK codewords. This index is the decoded 8-bit data.

FIG. 3 illustrates an example of the multipath profile generated by the CIR Estimation block 24. The chip period is denoted as $T_C$. Generally speaking, seven or eight FF and FB complex taps (i.e., about one CCK symbol period each), are generated in the CIR Estimation block 24 during Mode 1. The estimated FF and FB tap weights (the multipath profile) are denoted as $F_i$ and $B_i$ ($i=1, 2, \ldots 7$ or 8), respectively.

Figure 4:
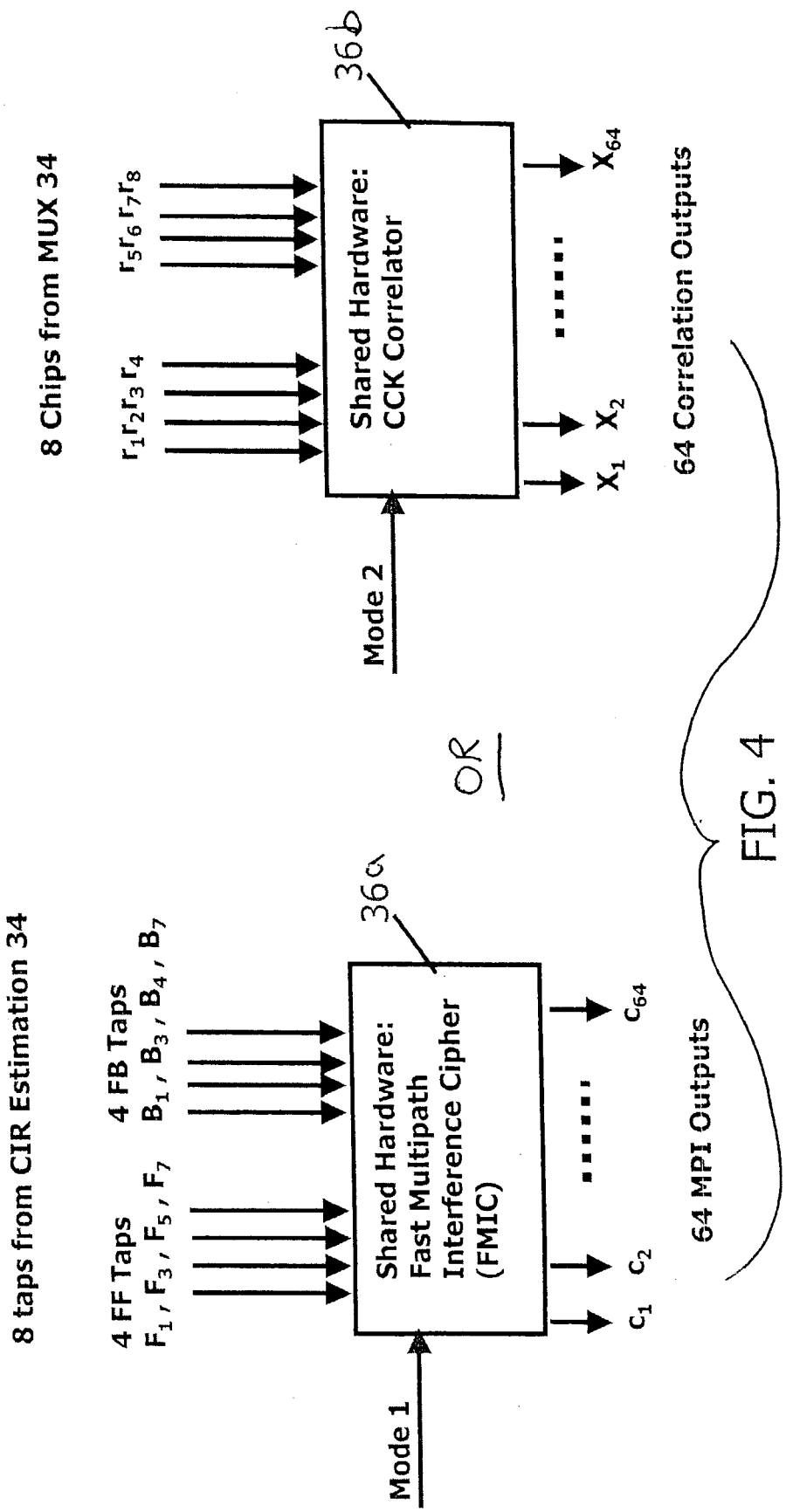
FIG. 4 illustrates the Shared Hardware of the receiver of FIG. 2.

The operations of the Shared Hardware 36 are shown in FIG. 4. The second selector 26 is omitted from FIG. 4, and the corresponding eight inputs from the second selector 26 are shown directly. During Mode 1, four FF taps and four FB taps estimated from the CIR Estimation block 24 are provided to the FMIC block 36a. The 64 MPI outputs are denoted as $c_i$, $i=1, 2, \ldots, 64$. During Mode 2, the eight-chip outputs of the MUX 34 (denoted as $r_1$ to $r_8$) are provided to the CCK Correlator 36b. The CCK Correlator 36b applies Fast Walsh Transform (FWT) to calculate the correlations of the eight received chips and 64 codewords. The 64 CCK correlation outputs are denoted as $X_i$, $i=1, 2, \ldots, 64$.

Figure 5:
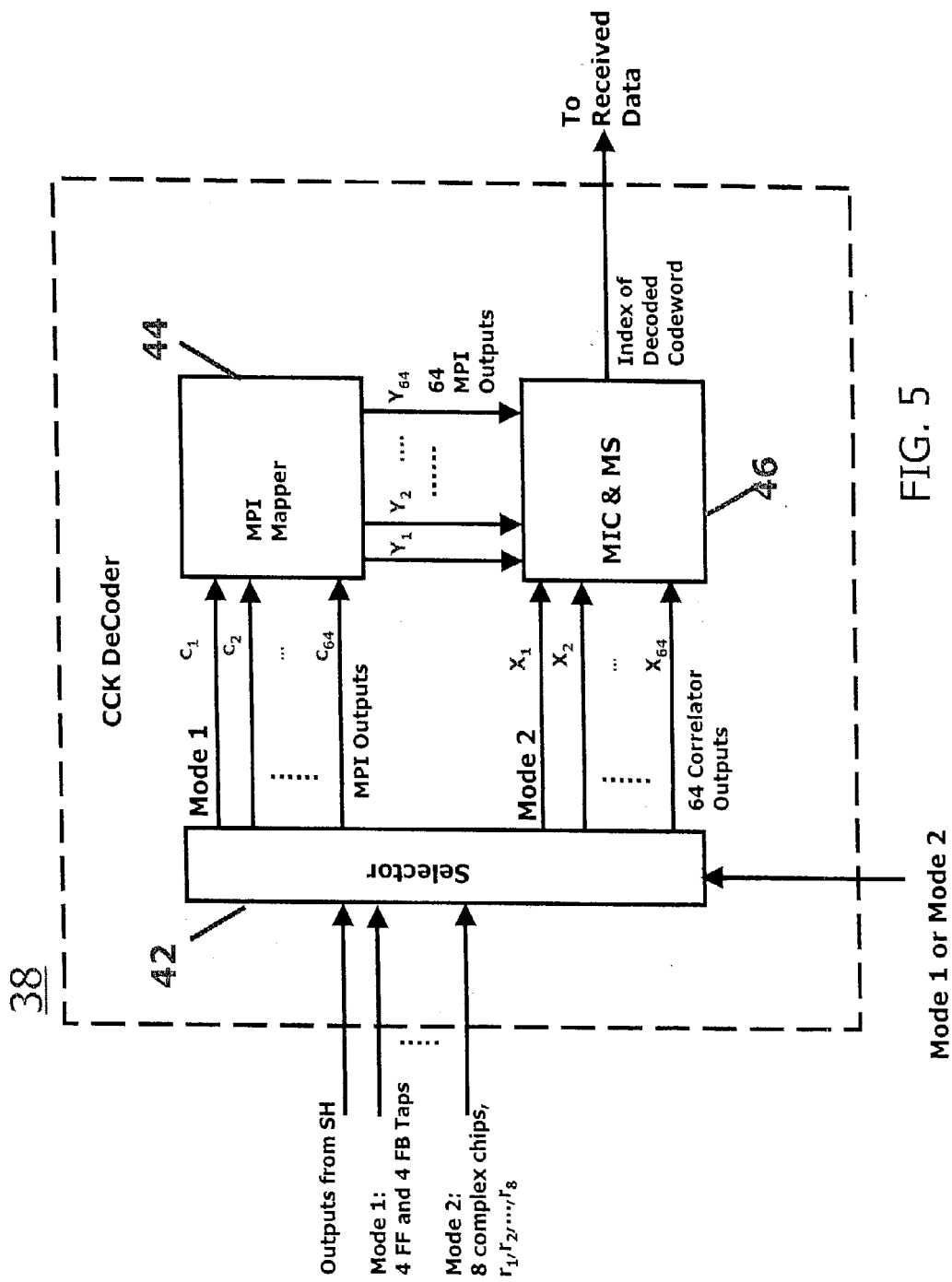
FIG. 5 illustrates the CCK Decoder of the receiver of FIG. 2.

The CCK Decoder 38 is illustrated in FIG. 5. The CCK Decoder 38 has a Selector 42, an MPI Mapper 44, and a Multipath Interference Canceller and Maximum Selector (MIC & MS) block 46. During Mode 1, the 64 MPI outputs from FMIC block 36a are permuted and stored in the MPI Mapper block 44. The permuted MPI outputs (denoted as $Y_i$, $I=1, 2, \ldots, 64$) are the corresponding ICI distortions to all 256 codewords. During Mode 2, the 64 correlation outputs are coupled to the MIC & MS block 46. The corresponding ICI distortions are then subtracted from the CCK correlation outputs in the MIC & MS block 46. The detailed implementation of FIG. 5 will be described later.

A CCK modulated symbol (8 chips long) designed for an 802.11b system is described in IEEE Std. 802.11b, D8.0, IEEE Standards Department, Piscataway, N.J., September 2001, whose disclosure is incorporated by this reference as though set forth fully herein. Each codeword described by a vector is given by $$C = [c_k] = e^{j(\phi_1+\phi_2+\phi_3+\phi_4)}, e^{j(\phi_1+\phi_3+\phi_4)},$$
$$e^{j(\phi_1+\phi_2+\phi_4)}, -e^{j(\phi_1+\phi_4)}, e^{j(\phi_1+\phi_2+\phi_3)},$$
$$e^{j(\phi_1+\phi_3)}, -e^{j(\phi_1+\phi_2)}, e^{j\phi_1}]^T$$

Each of four encoded phases, $\phi_1$, $\phi_2$, $\phi_3$, and $\phi_4$ has one of the following four values: 0, $\pi/2$, $\pi$, or $3\pi/2$. Therefore, there are $4^4=256$ codewords. An optimal demodulator is to find one of the 256 codewords which has the maximum correlation with the received CCK symbol. In internal testing done by the inventors, the 256 CCK correlation outputs generated from a well-known Fast-Walsh-Transform (FWT) is given by:

$$W(\phi_1, \phi_2, \phi_3, \phi_4) \equiv R^H C = \sum_{k=1}^{8} r_k^* c_k \quad \text{Eq. (1)}$$
$$= \{[(r_1^* e^{j\phi_2} + r_2^*)e^{j\phi_3} + (r_3^* e^{j\phi_2} - r_4^*)]e^{j\phi_4} +$$
$$(r_5^* e^{j\phi_2} + r_6^*)e^{j\phi_3} + [-r_7^* e^{j\phi_2} + r_8^*]\}e^{j\phi_1}$$

where $r_i$ ($i=1, 2, 3, \ldots, 8$) is the received CCK symbol (8 complex chips), and the notations, star '*' and minus '−', denote the complex conjugate and the complex negative (or subtraction) of a complex number, respectively. The Fast Walsh Transform (FWT) is a well-known algorithm that calculates all 64 or 256 correlations jointly with a minimal number of mathematical operations (multiplications and/or additions) and hardware processing time. Features of a FWT include:

(1) A common complex factor, $e^{j\phi_1}$, which has one of the following values (1,j,−1 and −j), is found for all 256 correlation outputs. Therefore, it is only necessary to calculate 64 correlation outputs to expand to 256 outputs.
(2) The 64 (or 256) CCK correlation outputs are "jointly" (but not independently) calculated.
(3) All common factors of all 64 (or 256) correlations are calculated only once in the intermediate steps (i.e., the number of complex calculations are minimized).
(4) For any 802.11b receiver, significant hardware and processing time are still required to implement this CCK Correlator 40 to operate in Mode 2. However, the hardware to perform CCK correlation would be idle during Mode 1.

The present invention shows that essentially the same hardware for CCK correlation can also be used during Mode 1 to calculate the MPIs. In other words, the present invention eliminates the need for all (64 or 256) complex convolutions and correlations required in Webster.

Figure 6:
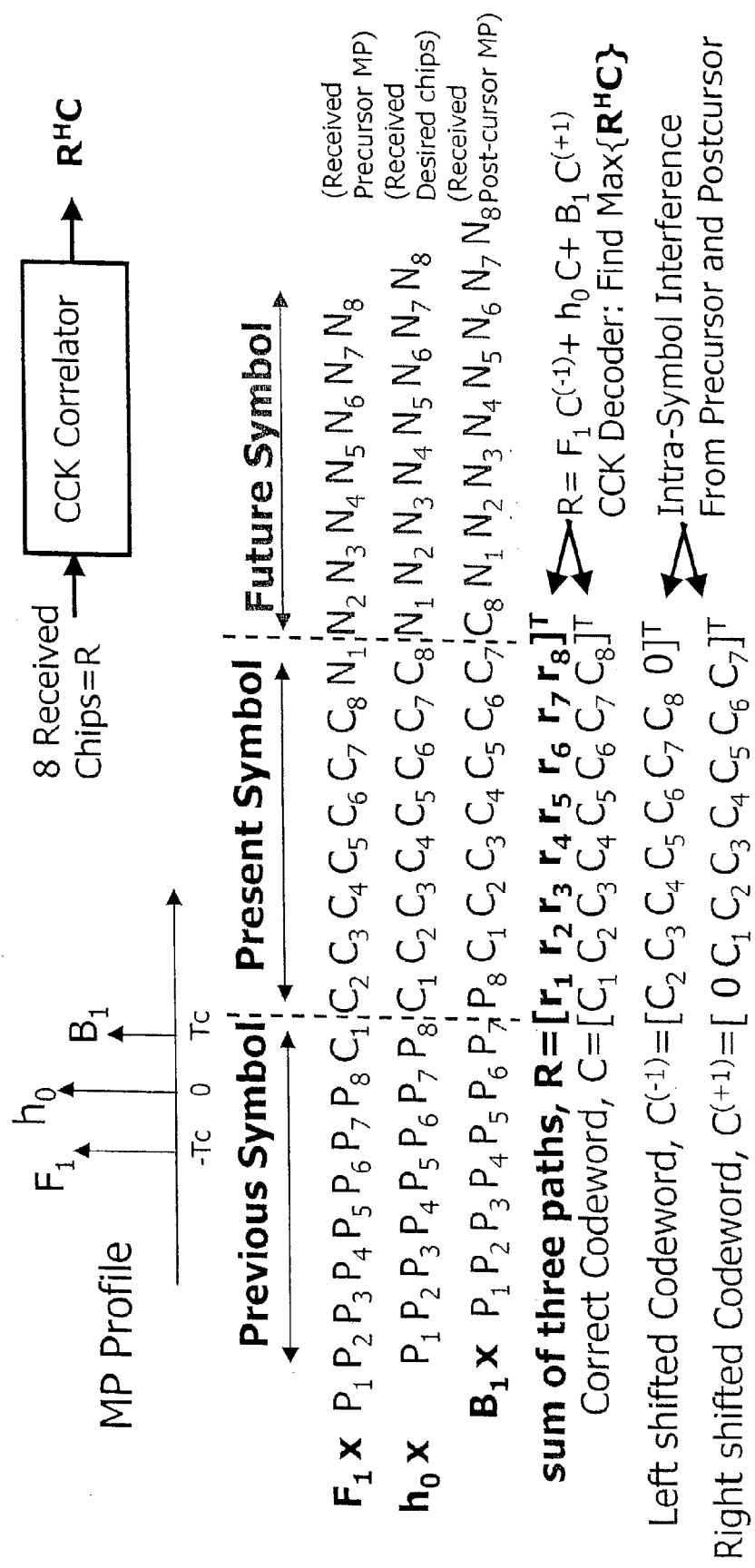
FIG. 6 illustrates an example of the multipath interference of the receiver of FIG. 2.

FIG. 6 illustrates an example of the ICI at the CCK correlator 36b output using three transmitted CCK codewords (P, C, and N, 8 chips each). A particular multipath profile with three multipaths is assumed: one pre-cursor $F_1$, one desired signal path $h_0$, and one post-cursor with a complex gain $B_1$. The received signal vector has one desired signal path plus two ICIs from the un-desired multipaths. In short, the received signal vector can be described as $$R = h_0 C + B_1 [C^{(+1)}] + F_1 C^{(-1)}$$

The first term in the above equation represents the desired signal vector. The post- and pre-cursor ICIs are described as the right- and left-shifts of the transmitted codeword vector, C, respectively. Then, the CCK Decoder 38 is applied to find one codeword, out of 256 correlation results, having the maximal correlation, $R^H C$, with the received signal vector, i.e.:

$$R^H C = h^*_0 C^H C + B^*_1 [C^{(+1)}]^H C + F^*_1 [C^{(-1)}]^H C$$

where the notation, $^h$, denotes a complex conjugate and transpose operation of the received signal vector. The last two terms in the above equation are the post-correlation ICIs from the pre-cursor and the post-cursor that may cause an incorrect decoding decision and degrade the system performance.

In general, the post-correlation ICIs of the received signal vector with a MP profile shown in FIG. 3 is given by:

$$R \equiv h_0 C + \sum_{k=1}^{7} \{F_k [C^{(-k)}] + B_k [C^{(+k)}]\}$$

which has 7 pre-cursors, 7 post-cursors, and one desired signal path. Therefore, the output of the CCK Correlator 36b is given by $$R^H C = h^*_0 C^H C + ICI; \text{ where } ICI \equiv \sum_{k=1}^{7} \{F^*_k [C^{(-k)}]^H C + B^*_k [C^{(+k)}]^H C\}$$

In the present invention, the post-correlation ICIs from both pre-cursors and post-cursors will be calculated as follows using the FMIC block 36a and then cancelled in the CCK Decoder block 38.

It is observed that the ICI of the received signal vector is a summation of shifted versions of the desired codeword. For examples, the pre-correlation ICIs from the pre-cusor $F_1$ and the post-cursor $B_1$ are given by $$F_1 C^{(-1)} \equiv F_1 [e^{j(\phi_1 + \phi_3 30\ \phi_4)}, e^{j(\phi_1 + \phi_2 + \phi_4)}, -e^{j(\phi_1 + \phi_4)},$$
$$e^{j(\phi_1 + \phi_2 + \phi_3)}, e^{j(\phi_1 + \phi_3)}, -e^{j(\phi_1 + \phi_2)}, e^{j\phi_1}, 0]^T$$

$$B_1 C^{(+1)} \equiv B_1 [0 e^{j(\phi_1 + \phi_2 30\ \phi_3 + \phi_4)}, e^{j(\phi_1 + \phi_3 + \phi_4)},$$
$$e^{j(\phi_1 + \phi_2 + \phi_4)}, -e^{j(\phi_1 + \phi_4)}, e^{j(\phi_1 + \phi_2 + \phi_3)}, e^{j(\phi_1 + \phi_3)}, -e^{j(\phi_1 + \phi_2)}]^T$$

For multipaths with a relative delay equal to an even number of chips from the desired signal path, it can be shown that the post-correlation ICIs are all equal to zero at the CCK Correlator 36b output when applying the following auto-correlation property of the CCK codewords:

$$[C^{(-k)}]^H C = [C^{(+k)}]^H C = 0, \text{ if } j = 2, 4, \text{ or } 6. \quad \text{Eq.(1a)}$$

Then, the overall ICI computation can be simplified to:

$$ICI = \sum_{k=1,3,5,7} \{F^*_k [C^{(-k)}]^H C + B^*_k [C^{(+k)}]^H C\}$$
$$\equiv f(\phi_2, \phi_3, \phi_4)$$
$$\equiv f_F(\phi_2, \phi_3, \phi_4) + f_B(\phi_2, \phi_3, \phi_4)$$

where $$f_F(\phi_2,\phi_3,\phi_4) = e^{j\phi_4} [e^{j\phi_2}(F^*_7 e^{j\phi_3} + F^*_3 e^{-j\phi_3} + 2F^*_5) + e^{-j\phi_2}$$
$$(-F^*_5 e^{j\phi_3} - F^*_1 e^{-j\phi_3} + 2F^*_3)]$$

$$f_B(\phi_2,\phi_3,\phi_4) = e^{-j\phi_4} [e^{j\phi_2}(-B^*_1 e^{j\phi_1} - B^*_5 e^{-j\phi_3} + 2B^*_3) +$$
$$e^{-j\phi_1} (B^*_3 e^{j\phi_3} + B^*_7 e^{-j\phi_3} 2B^*_5)] \quad \text{Eq.(2)}$$

The functions, $f_F(\phi_2, \phi_3, \phi_4)$ and $f_B(\phi_2, \phi_3, \phi_4)$ are ICIs caused by precursors (items containing $F_i$'s) and postcursors (items containing $B_i$'s), respectively. Therefore, not only is the ICI from post-cursors canceled (as in Webster), but the ICI from pre-cursors is also canceled. In contrast, Webster did not address ICI due to post-cursors only.

Equation (2) is a function of the encoded phases, $\phi_2$, $\phi_3$, $\phi_4$, only $\phi_1$ has no impact on ICI). The CCK encoded phases, $\phi_2$, $\phi_3$, $\phi_4$ each has one of the following four values: 0, $\pi/2$, $\pi$, or $3\pi/2$. Therefore, there are $4^3 = 64$ MPI outputs in Equation (2). As a result, the total number of MPI values for all 256 codewords is reduced from $256(=4^4)$ as in Webster to $64(=4^3)$ in the present invention. Thus, the architecture of the present invention provides for a reduction in the complexity of the hardware and for power savings. Further reductions to 32, 16, or 8 can be derived as follows.

The structure to calculate MPI outputs in Equation (2) is found to be similar to that which is used to calculate the 64 CCK correlation outputs (denoted as $X_i$, i=1, 2, ..., 64) in Equation (1). Equation (1) shows that:

(a) the number of MPI calculations can be reduced from 256 to 64, (b) the MPIs can be computed jointly with an algorithm similar to the Fast Walsh Transform, and (c) the CCK Correlator 36b hardware can be reused for MPI computations.

The fast algorithm to compute the MPIs will be called "Fast Multipath Transform", or FMT. A detailed description on the reuse of CCK Correlator 36b hardware for MPI computations in the FMIC block 36a will be described below.

Figure 7:
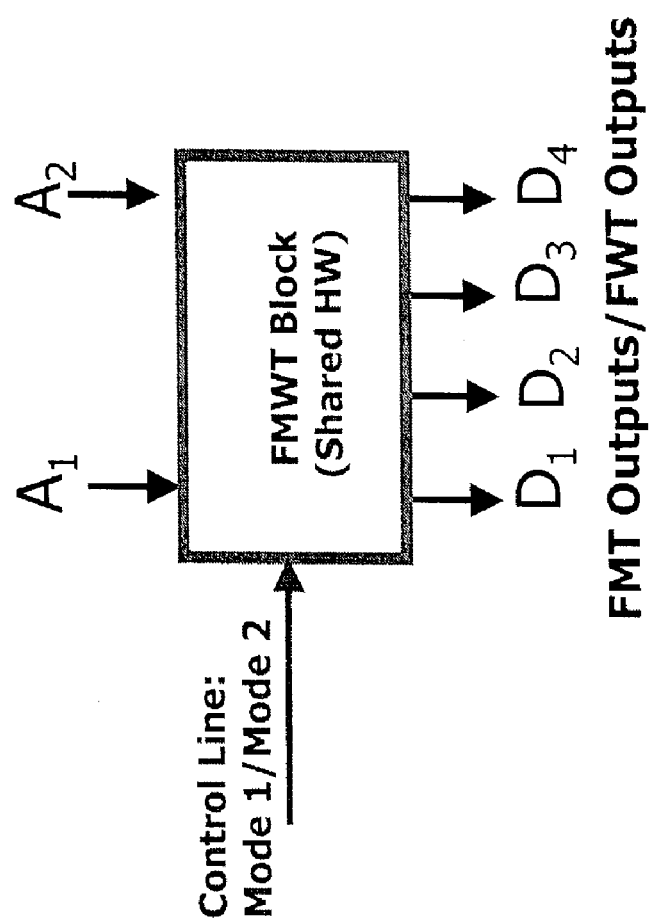
FIG. 7 illustrates a basic hardware building block that can be reused to implement a Fast Multipath Transform (FMT) and a Fast Walsh Transform (FWT).

The basic hardware building block that can be shared for a FMT in Mode 1 and a FWT in MODE 2 is denoted as a Fast Multipath/Walsh Transform (FMWT) block and is illustrated in FIG. 7. The internal operations of the FMWT block require only complex additions (and no multiplication). The four complex outputs (from $D_1$ to $D_4$) are the additions of the real and/or imaginary parts of the two complex inputs ($A_1$ and $A_2$) as shown in Equations (3a) and (3b) below. A control line is applied to select Mode 1 or 2. According to the selected mode, the four different complex outputs will be provided based on Equation (3a) or (3b). The mathematical relationships between two complex inputs ($A_1$ and $A_2$) and four complex outputs ($D_1$, $D_2$, $D_3$ and $D_4$) are given by:

In Mode 1 (FMT outputs):

$$Re\{D_1\} = Re\{A_1 + A_2\} = Re\{A_1\} + Re\{A_2\}$$

$$Im\{D_1\} = Im\{A_1 + A_2\} = Im\{A_1\} + Im\{A_2\}$$

$$Re\{D_2\} = Re\{jA_1 - jA_2\} = -Im\{A_1\} + Im\{A_2\}$$

$$Im\{D_2\} = Im\{jA_1 - jA_2\} = Re\{A_1\} - Re\{A_2\}$$

$$Re\{D_3\} = Re\{-A_1 - A_2\} = -Re\{A_1\} - Re\{A_2\}$$

$$Im\{D_3\} = Im\{-A_1 - A_2\} = -Im\{A_1\} - Im\{A_2\}$$

$$Re\{D_4\} = Re\{-jA_1 + jA_2\} = Im\{A_1\} - Im\{A_2\}$$

$$Im\{D_4\} = Im\{-jA_1 + jA_2\} = -Re\{A_1\} + Re\{A_2\} \quad \text{Eq.(3a)}$$

In Mode 2 (FWT outputs):

$$Re\{D_1\}=Re\{A_1+A_2\}=Re\{A_1\}+Re\{A_2\}$$

$$Im\{D_1\}=Im\{A_1+A_2\}=Im\{A_1\}+Im\{A_2\}$$

$$Re\{D_2\}=Re\{jA_1+A_2\}=-Im\{A_1\}+Re\{A_2\}$$

$$Im\{D_2\}=Im\{jA_1+A_2\}=Re\{A_1\}+Im\{A_2\}$$

$$Re\{D_3\}=Re\{-A_1+A_2\}=-Re\{A_1\}+Re\{A_2\}$$

$$Im\{D_3\}=Im\{-A_1+A_2\}=-Im\{A_1\}+Im\{A_2\}$$

$$Re\{D_4\}=Re\{-jA_1+A_2\}=Im\{A_1\}+Re\{A_2\}$$

$$Im\{D_4\}=Im\{-jA_1+A_2\}=-Re\{A_1\}+Im\{A_2\} \quad \text{Eq.(3b)}$$

where the notations, Re{ } and Im{ }, denote the real part and the imaginary part of the complex number inside the brackets and the complex scalar j is defined as the square-root of (−1). Therefore, no multiplication is required for this basic building block in both modes 1 and 2.

One may program the same hardware block to operate in either Mode 1 or Mode 2 as shown in FIG. 7, since Mode 1 and Mode 2 do not operate at the same time.

Furthermore, the number of MPI outputs can be reduced from 64 to 32 or 16 for all 256 codewords. One can observe from Equation (2):

$$f_1(\phi_2+\pi,\phi_3,\phi_4)=-f_1(\phi_2,\phi_3,\phi_4), \phi_2=0 \text{ or } \pi/2 \quad \text{Eq.(4a)}$$

From Equation (4a), it is not necessary to calculate the MPI outputs for the cases when encoded phase $\phi_4$ is $\pi$ or $3\pi/2$. Similarly, $$f_1(\phi_2,\phi_3,\phi_4+\pi)=-f_1(\phi_2,\phi_3,\phi_4), \phi_4=0 \text{ or } \pi/2 \quad \text{Eq.(4b)}$$

$$f_1(\phi_2+\pi,\phi_3,\phi_4+\pi)=f_1(\phi_2,\phi_3,\phi_4), \phi_2,\phi_4=0 \text{ or } \pi/2 \quad \text{Eq.(4c)}$$

From Equations (4b) and (4c), only two choices are necessary to calculate the MPI outputs for the encoded phases $\phi_2$ or $\phi_4$. Since there are four choices to choose the encoded phase $\phi_3$, the number of required MPI outputs is 4×2×2 or 16. All other 48 MPI outputs have the same absolute values as these 16 MPI outputs but may have a negative sign.

If the dominant ICI in a system is caused by the post-cursors (or the pre-cursors) only, the number of required MPI outputs can be further reduced to 8 using the following properties:

$$f_F(\phi_2,\phi_3,\phi_4)=e^{j\phi_4}f_{F1}(\phi_2,\phi_3); f_{F1}(\phi_2+\pi,\phi_3)=-f_{F1}(\phi_2,\phi_3) \quad \text{Eq.(4d)}$$

$$f_B(\phi_2,\phi_3,\phi_4)=e^{-j\phi_4}f_{B1}(\phi_2,\phi_3); f_{B1}(\phi_2+\pi,\phi_3)=-f_{B1}(\phi_2,\phi_3) \quad \text{Eq.(4e)}$$

For example, one only needs to calculate the function, $f_{F1}(\phi_2,\phi_3)$ or $f_{B1}(\phi_2,\phi_3)$, which has two choices of $\phi_2$ and four choices of $\phi_3$. The complex scalar, exp($j\phi_4$), has one of the four values: 1, j, −1, or −j. In the practical hardware implementation, these operations are implemented by changing the (positive/negative) signs and/or by switching the real/imaginary parts of the values, i.e., without any calculations.

In short, it is required to first calculate the eight values of the function, $f_{F1}(\phi_2,\phi_3)$, or $f_{B1}(\phi_2,\phi_3)$, then the function, $f_F(\phi_2,\phi_3,\phi_4)$, or $f_B(\phi_2,\phi_3,\phi_4)$ can be obtained from changing the (positive/negative) signs and/or switching the real/imaginary parts of the function, $f_{F1}(\phi_2,\phi_3)$, or $f_{B1}(\phi_2,\phi_3)$.

Implementations of Equations (4a)–(4e) will be provided below as three embodiments. Other mathematically-equivalent embodiments based upon (but not limited to) Equation (2) are given by:

$$\begin{aligned}f_2(\phi_2,\phi_3,\phi_4)=&e^{j(\phi_4+\phi_2)}(F^*_7e^{j\phi_3}+F^*_3e^{-j\phi_3}+2F^*_5)+\\&e^{j(\phi_4-\phi_2)}(-F^*_5e^{j\phi_3}-F^*_1e^{-j\phi_3}+2F^*_3)+e^{j(-\phi_4+\phi_2)}\\&(-B^*_1e^{j\phi_3}-B^*_5e^{-j\phi_3}+2B^*_3)+e^{-j(\phi_4+\phi_2)}(B^*_3e^{j\phi_3}+\\&B^*_7e^{-j\phi_3}+2B^*_5)\end{aligned} \quad \text{Eq.(5a)}$$

$$\begin{aligned}f_3(\phi_2,\phi_3,\phi_4)=&e^{j\phi_4}\{[F^*_7e^{j(\phi_2+\phi_3)}+F^*_3e^{j(\phi_2-\phi_3)}+\\&2F^*_5e^{j\phi_2}]+[-F^*_5e^{j(-\phi_2+\phi_3)}-F^*_1e^{-j(\phi_2+\phi_3)}+\\&2F^*_3e^{-j\phi_2}]\}+e^{-j\phi_4}\{[-B^*_1e^{j(\phi_2+\phi_3)}-B^*_5e^{j(\phi_2-\phi_3)}+\\&2B^*_3e^{j\phi_2}]+[B^*_3e^{j(-\phi_2+\phi_3)}+B^*_7e^{-j(\phi_2+\phi_3)}+\\&2B^*_5e^{-j\phi_2}]\}\end{aligned} \quad \text{Eq.(5b)}$$

$$\begin{aligned}f_4(\phi_2,\phi_3,\phi_4)=&e^{j\phi_2}[F^*_7e^{j(\phi_4+\phi_3)}+F^*_3e^{j(\phi_4-\phi_3)}+2F^*_5e^{j\phi_4}]+\\&e^{-j\phi_2}[-F^*_5e^{j(-\phi_4+\phi_3)}F^*_1e^{j(\phi_4-\phi_3)}-2F^*_3e^{j\phi_4}]+e^{-j\phi_2}\\&[-B^*_1e^{j(-\phi_4+\phi_3)}-B^*_5e^{-j(\phi_4+\phi_3)}+2B^*_3e^{-j\phi_4}]+e^{j\phi_2}\\&[B^*_3e^{-j(-\phi_4+\phi_3)}+B^*_7e^{-j(\phi_4+\phi_3)}+2B^*_5e^{-j\phi_4}]\end{aligned} \quad \text{Eq.(5c)}$$

$$\begin{aligned}f_5(\phi_2,\phi_3,\phi_4)=&[F^*_7e^{j(\phi_4+\phi_2+\phi_3)}+F^*_3e^{j(\phi_4+\phi_2-\phi_3)}+\\&2F^*_5e^{j(\phi_4+\phi_2)}]+[-F^*_5e^{j(\phi_4-\phi_2+\phi_3)}-F^*_1e^{j(\phi_4-\phi_2-\phi_3)}+\\&2F^*_3e^{j(\phi_4-\phi_2)}]+[-B^*_1e^{j(-\phi_4+\phi_2+\phi_3)}-\\&B^*_5e^{j(-\phi_4+\phi_2-\phi_3)}+2B^*_3e^{j(-\phi_4+\phi_2)}]+\\&[B^*_3e^{-j(-\phi_4+\phi_2+\phi_3)}+B^*_7e^{-j(\phi_4+\phi_2+\phi_3)}+2B^*_5e^{-j(\phi_4+\phi_2)}]\end{aligned} \quad \text{Eq.(5d)}$$

Since there are no common factors in Equations (5a)–(5d) among items, the FMT algorithm cannot be applied to evaluate the 64 (or 32 or 16) MPI outputs in Equations (5a)–(5d). More hardware complexity is therefore required to compute the MPIs using any one of the Equations (5a)–(5d) when compared to the FMT implementation based on Equation (2). However, each embodiment in Equations (5a)–(5d) requires much less hardware complexity and processing time than those required in Webster, which requires all 256 MPIs to be computed.

Figure 8:
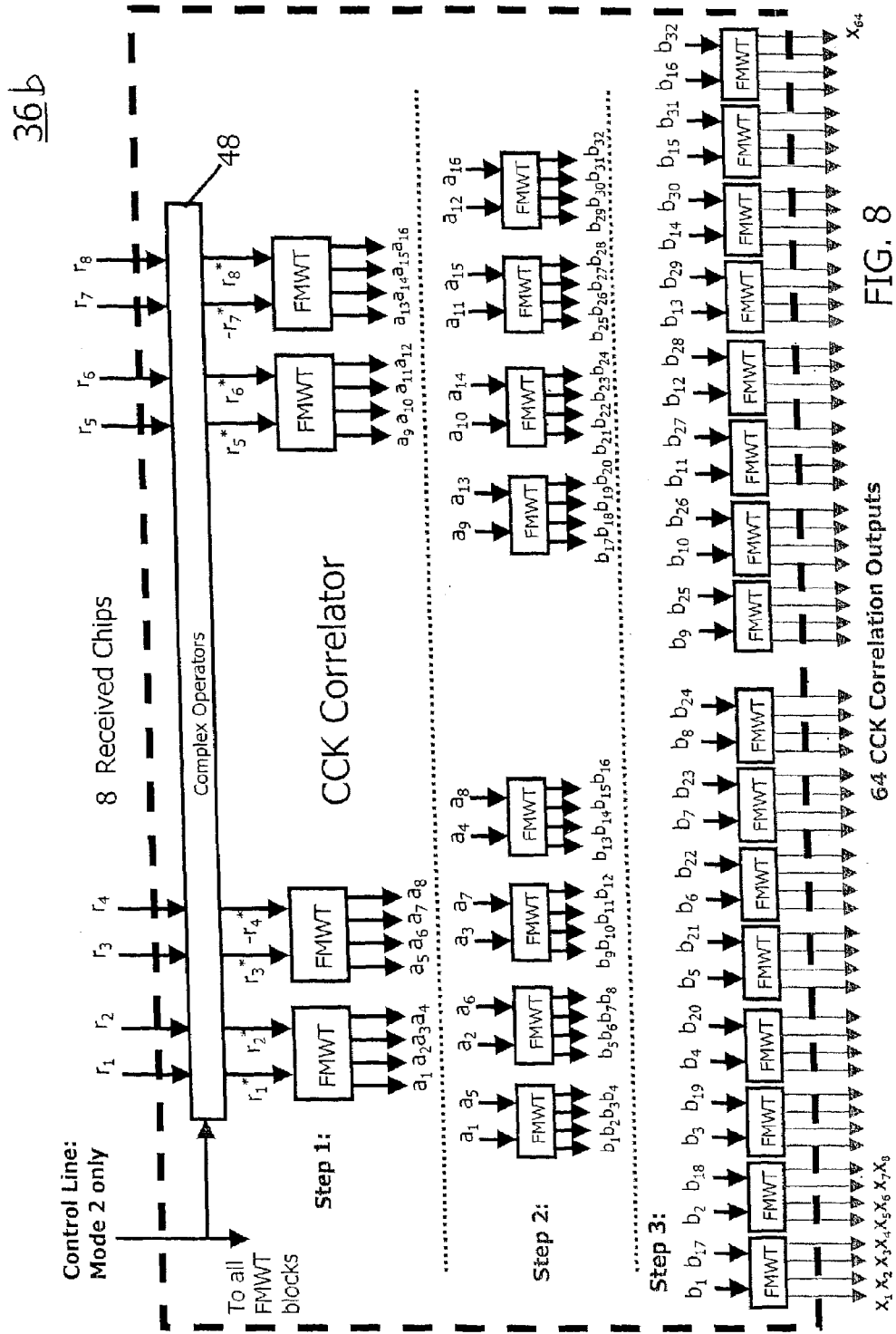
FIG. 8 illustrates one embodiment of the CCK Correlator of FIG. 4.

FIG. 8 illustrates the structure of a CCK Correlator 36b using the FMWTs as the basic building blocks. The control line provides a Mode 2 indication to all FMWT blocks. The eight chips, $r_1, r_2, \ldots, r_8$, from the outputs of the MUX 34 are fed into the complex operators block 48. These complex operators are required to prepare the received signals for correlation operations. The eight inputs and eight outputs of the complex operators block 48 are shown in FIG. 8. The notations, star '*' and minus '−' denote the complex conjugate and the complex negative of a complex number, respectively. Three steps (shown in FIG. 8 as "Step 1", "Step 2" and "Step 3") are then required to compute the 64 correlation outputs jointly. All inputs, outputs, and connections (e.g., $a_i$, where i=1, ..., 16, and $b_j$, where j=1, ..., 32) are labeled in FIG. 8. The 64 CCK correlation outputs (denoted as $X_i$, i=1, 2, ..., 64) are fed to the MIC & MS block 46. Since only FMWT blocks are used, the overall calculations in FIG. 8 are free of multiplications. With FMWT as its basic building block, this implementation of a CCK Correlator 36b is based on the Fast Walsh Transform with the following advantages: (a) the 64 CCK correlation outputs are "jointly" (but not independently) calculated, and (b) the number of complex calculations is minimized because all common factors of all 64 correlations are calculated only once in the intermediate steps.

Figure 9:
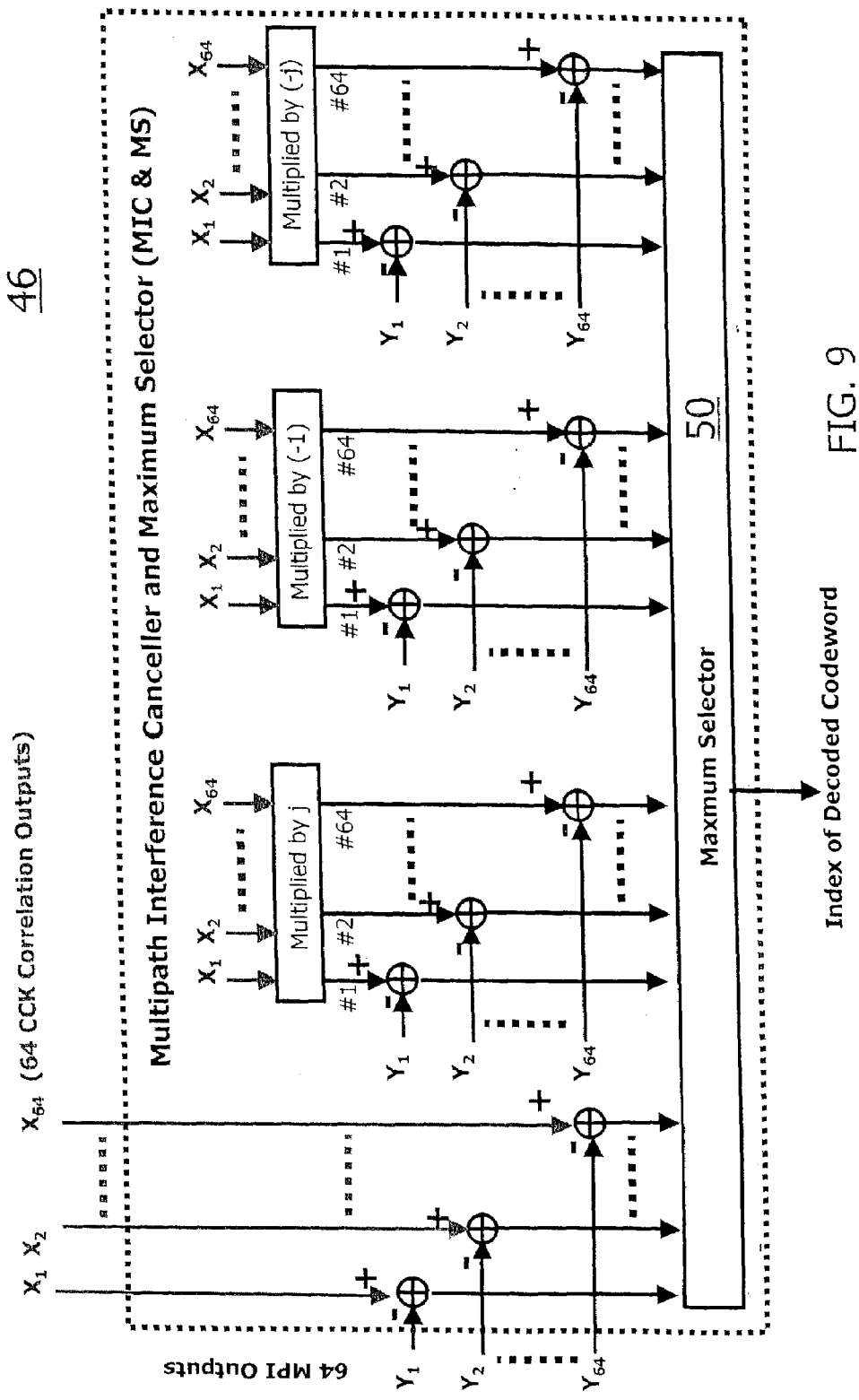
FIG. 9 illustrates a Multipath Interference Canceller and Maximum Selector (MIC & MS) block of the CCK Decoder of FIG. 5.

FIG. 9 illustrates the operation of the MIC & MS block 46. The 64 CCK correlation outputs (denoted as $X_i$, i=1, 2, ..., 64) from the CCK Correlator 36b are expanded into 256 CCK correlations for a total of 256 codewords. The corresponding MPI (only the real part is needed although not shown in FIG. 9) for each codeword is subtracted from the 256 CCK correlation outputs. A Maximum Selector block 50 will find the index (between 1 and 256) of the codeword which has the real maximum correlation (only the real-part of the complex correlation results will be compared in maximum selection although not shown in FIG. 9). FIG. 9 does show that, in the present invention, only 64 MPI outputs (from FMIC block 36*a*) are needed for all 256 codewords from the mathematical derivations. In contrast, Webster requires 256 ICI bias for MPI cancellations.

In summary, the present invention derives a mathematical equation, Equation (2), which provides an optimal algorithmic structure (FMT) to compute MPIs required for ICI cancellations. The algorithm jointly computes the ICI of a plurality of possible codewords. This algorithmic structure is similar to the optimal architecture (FWT) required for CCK correlation computations. One can, therefore, take advantage of this similarity between these two structures and reuse essentially the same hardware at different times. Other mathematically equivalent embodiments to Equation (2) are characterized by Equations (5a)–(5d). One can use any of the Equations (5a)–(5d) to show that the number of required MPI outputs for ICI cancellation is also reduced from 256 to 64. From Equations (2), or (5a)–(5d), one can derive the symmetry properties shown in Equations (4a)–(4e). With these symmetry properties, one needs to compute only 32, 16, or 8 of the 64 MPIs and then derive all 64 MPIs based on Equations (4a)–(4e).

Figure 11:
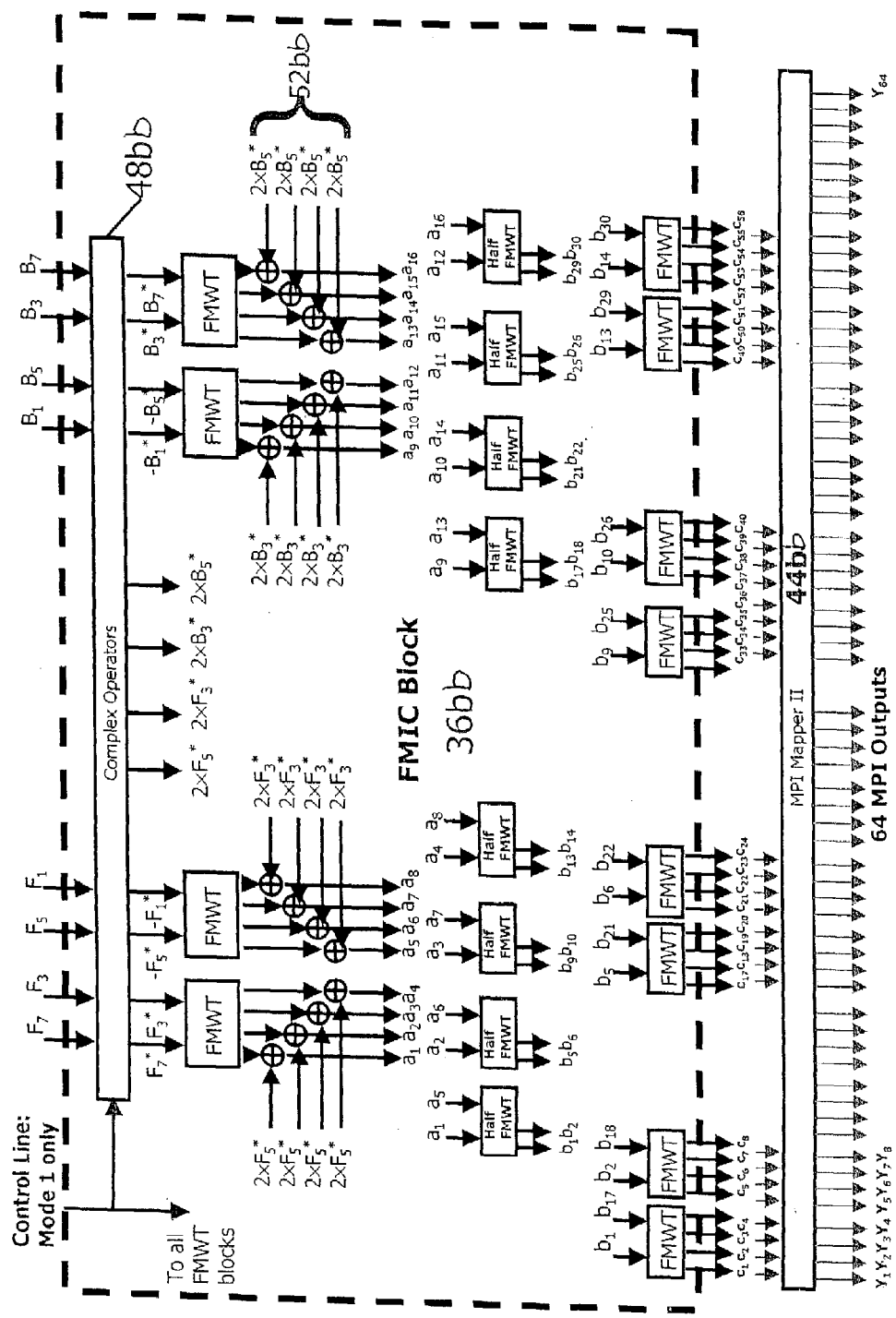
FIG. 11 illustrates another embodiment of an FMIC block of FIG. 4.
Figure 12:
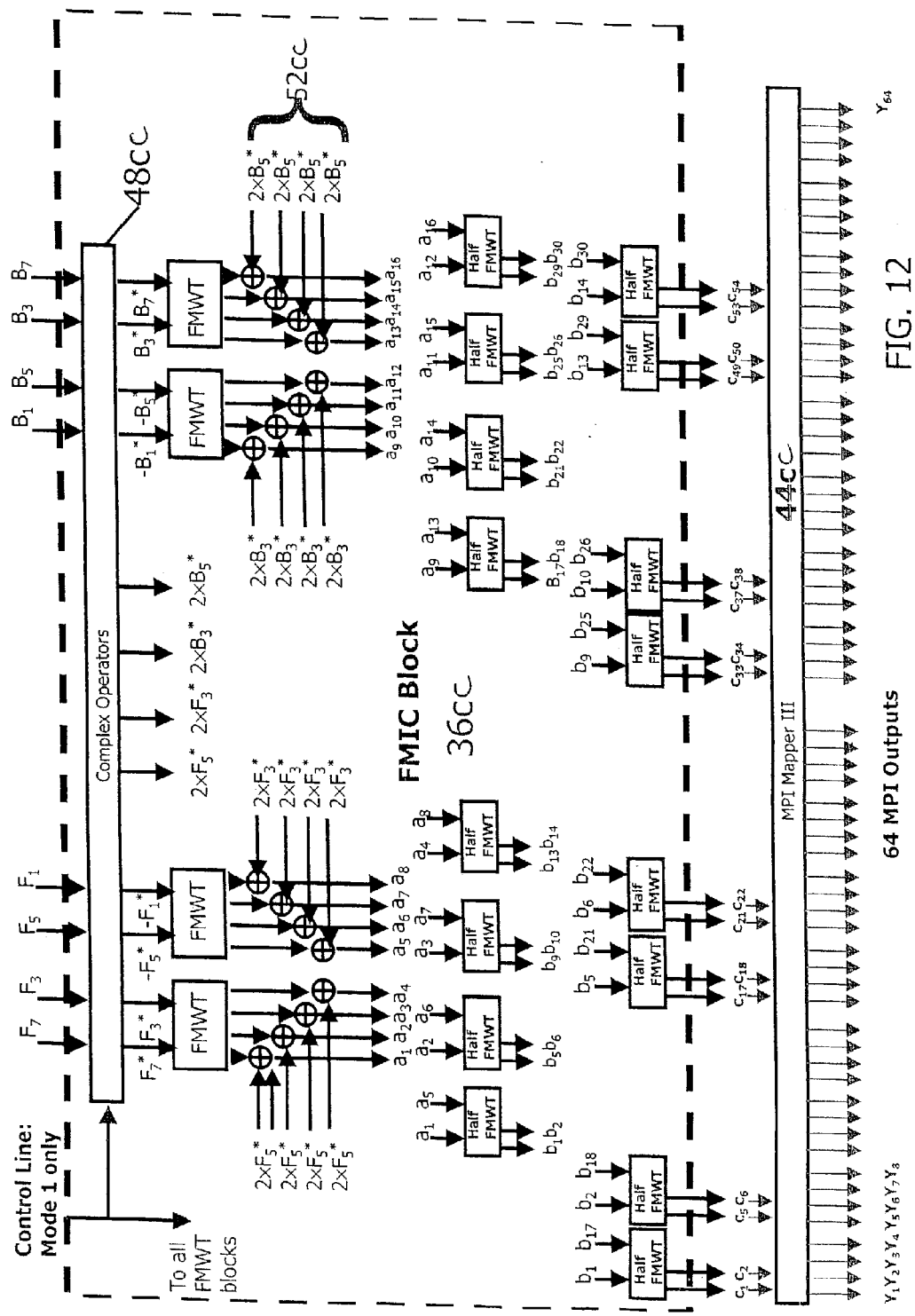
FIG. 12 illustrates yet another embodiment of an FMIC block of FIG. 4.

FIGS. 10, 11 and 12 illustrate three embodiments of FMIC blocks computing 64, 32, and 16 MPI outputs, respectively. Each one has an MPI mapper to generate the permuted MPIs. A table illustrating the inputs and outputs of the MPI mappers for FIGS. 10–12 is set forth in FIG. 14.

One first embodiment of the FMIC block 36*a* of FIG. 4 is illustrated in FIG. 10 in the form of FMIC block 36*aa*. Any CCK receiver requires a CCK Correlator 36*b*. The same FMWT blocks for the CCK Correlator 36*b* operating in Mode 2 can be reused, as shown in the FMIC block 36*a* operating in Mode 1, to compute the 64 MPIs. The eight inputs (four FF taps and four FB taps) to the FMIC block 36*aa* are outputs from the CIR Estimation block 24. The complex operators block 48*aa* performs simple mathematical operations such as complex conjugates, complex negative, and a multiplication by 2 (a 1-bit shift only without multiplications) on the inputs. When compared with the hardware used in the CCK Correlator 36*b* in FIG. 8, the FMIC block 36*aa* includes sixteen additional complex adders 52*aa* that are coupled to the outputs of the four FMWT blocks in Step 1. Twelve complex outputs of the complex operators block 48*aa* are inputted to the first four FMWT blocks and the 16 additional complex adders 52*aa*. An MPI Mapper I block 44*aa* is applied to generate the permuted MPIs. The 64 permuted MPI outputs, $Y_i$ (i=1, ..., 64), are provided to the MIC & MS block 46. In practical implementations, the 64 outputs $c_i$ from the last sixteen FMWT blocks can be connected directly (without any "hardware" MPI Mapper I) to the corresponding subtractors in the MIC & MS block 46 of FIG. 9, so the MPI Mapper I block in FIG. 10 is shown only for illustrative purposes. Since only FMWT blocks and adders 52*aa* are required by the embodiment shown in FIG. 10, this embodiment does not require the use of any multiplication operations.

FIGS. 11 and 12 illustrate alternative embodiments using FMIC blocks 36*bb* and 36*cc*, respectively. In these embodiments, one only needs to compute 32 or 16 MPI outputs. One can then derive all 64 MPIs based on the symmetry properties shown in Equation 4(a)–4(c). A table illustrating the relationship between the inputs and outputs based on Equations (4a)–(4c) is set forth in FIG. 14. One can observe that the sixty-four outputs ($Y_i$, i=1, 2, ..., 64) of Mapper I block 44*aa* are permutations of 64 inputs ($c_i$, i=1,2, ..., 64). On the other hand, the sixty-four outputs ($Y_i$, i=1,2, ..., 64) of Mapper II block 44*bb* are permutations of 32 inputs only ($c_i$, i=1–8, 17–24, 33–40, and 49–56). Finally, the sixty-four outputs ($Y_i$, i=1,2, ..., 64) of Mapper III block 44 cc are permutations of 16 inputs and their complex negatives ($c_i$, i=1,2,5,6,17,18,21,22,33,34,37,38,49,50,53, and 54).

Figure 13:
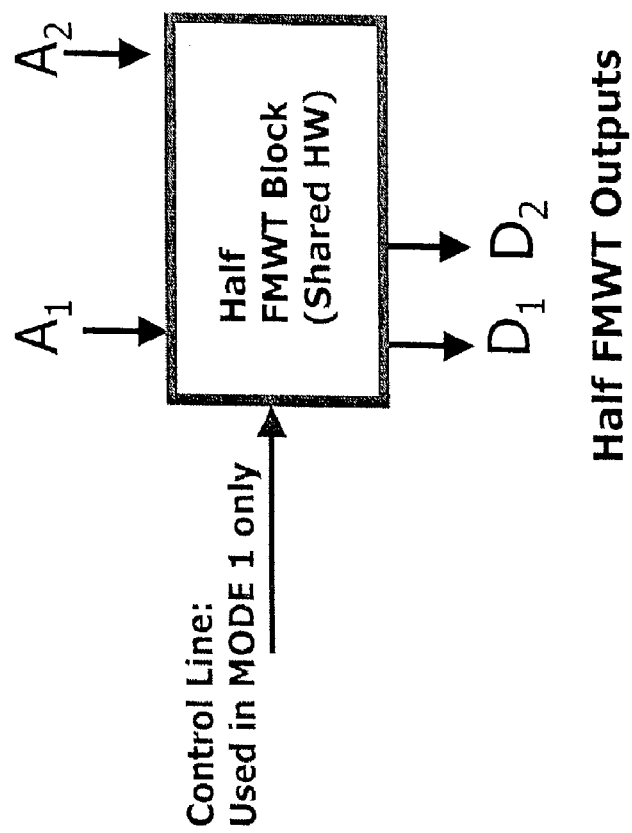
FIG. 13 illustrates a half FMWT block.

Since it is not necessary to calculate all 64 MPI outputs, it is desirable to deactivate the unnecessary outputs and FMWT blocks in practical implementations. A half FMWT, block shown in FIG. 13, is a partially de-activated FMWT block (with 2 of 4 outputs deemed unnecessary and therefore not shown). Specifically; one only needs the first two complex outputs of Equation (3a):

$$Re\{D_1\}=Re\{A_1+A_2\}=Re\{A_1\}+Re\{A_2\}$$

$$Im\{D_1\}=Im\{A_1+A_2\}=Im\{A_1\}+Im\{A_2\}$$

$$Re\{D_2\}=Re\{jA_1-jA_2\}=-Im\{A_1\}+Im\{A_2\}$$

$$Re\{D_2\}=Im\{jA_1-jA_2\}=Re\{A_1\}-Re\{A_2\} \qquad \text{Eq.(6)}$$

This (multiplication-free) half FMWT block operates in Mode 1 only.

Referring now to the embodiment shown in FIG. 11, the FMIC block 36*bb* has twelve FMWT blocks and eight half FMWT blocks. Only necessary outputs and FMWT blocks are shown. Deactivated FMWT blocks are not shown. Partially activated FMWT blocks are shown as half FMWT blocks with two inputs and two outputs. In FIGS. 8, 10, 11, and 12, the index for each output is preserved for easy reference (i.e., the indices of outputs and connections in FIGS. 8, 10, 11, and 12 can be cross-referenced). Thirty-two outputs, $c_i$ (shown at the end of the last eight FMWT blocks) are mapped into 64 MPI outputs by the MPI Mapper II block 44*bb* according to FIG. 14. The 64 MPI outputs are identical to the 64 MPI outputs obtained using the embodiment shown in FIG. 10.

Referring now to the embodiment shown in FIG. 12, the FMIC block 36*cc* has four FMWT blocks and sixteen half FMWT blocks. Only necessary outputs and FMWT blocks are shown. Deactivated FMWT blocks are not shown. Partially activated FMWT blocks are shown as half FMWT blocks with two inputs and two outputs. Sixteen outputs, $c_i$ (shown at the end of the last eight half FMWT blocks) are mapped into 64 MPI outputs by the MPI Mapper III block 44*cc* according to FIG. 14. The 64 MPI outputs are identical to the 64 MPI outputs obtained using the embodiment shown in FIG. 10.

The implementions of the FMIC block according to the present invention are not limited to those modeled based on Equations (2), (5a)–(5d). Other implementations of FMIC blocks which are mathematically equivalent to Equations (2), (5a)–(5d) are also encompassed within the scope of the present invention.

Thus, when compared with the RAKE receiver in Webster, the present invention provides numerous important advantages:

(1) The 64 MPI outputs for the FMIC block 36*a* in the present invention are obtained from essentially the same hardware used for the CCK Correlator 36*b* of FIG. 4.

(2) Only 64 (or 32, or 16 or even 8) MPI outputs are required for all 256 codewords, as opposed to 256 ICI outputs required by Webster for an optimal CCK Decoder.

(3) The 64 MPI outputs of the present invention are obtained from a structure similar to FWT which minimizes the required hardware (i.e., adders only), minimizes the number of complex calculations, and minimizes the processing time.

(4) While the 256 ICI outputs in Webster are calculated independently, the 64 MPI outputs in the present invention are jointly calculated. All common operations to obtain 64 (or 32 or even 16) different MPI outputs are calculated only once. Therefore, the number of operations is minimized.

(5) No multiplication operations are required for the present invention.

(6) In the present invention, the MPI from pre-cursors and post-cursors are calculated from the Feed-Forward (FF) and Feedback (FB) taps. In contrast, in Webster, only the MPI from post-cursors are calculated from only the FB taps. Therefore, the present invention can cancel more interference when compared to the architecture in Webster.

Those skilled in the art will appreciate that the embodiments and alternatives described above are non-limiting examples only, and that certain modifications can be made without departing from the spirit and scope thereof. The accompanying claims are intended to cover such modifications as would fall within the true scope and spirit of the present invention.

What is claimed is:

1. A complementary code keying (CCK) demodulator used in a RAKE receiver receiving CCK symbols in a multipath environment, the CCK demodulator comprising:

multipath interference estimation means, using feedback and feed-forward tap weights as inputs to a modified Fast Walsh Transform (FWT) based CCK correlator for jointly calculating a plurality of post-correlation intra-codeword chip interference (ICI) bias during a preamble period;

decoding means, using the same modified FWT based CCK correlator during a CCK data period for computing the correlation between the received CCK symbol and all possible CCK codewords, and then finding an index of a CCK codeword having the maximum correlation between the received CCK symbol and all possible CCK codewords, with the post-correlation ICI bias due to the received present ("to-be-decoded") CCK symbol removed; and wherein the modified FWT based CCK correlator, using a Fast Multipath/Walsh Transform (FMWT) block as its basic building blocks, forms an optimum CCK demodulator in the absence of multipath propagation.

2. The CCK demodulator of claim 1, further comprising:
channel estimation means for estimating a channel impulse response (CIR) and generating the feedback and feed forward tap weights during the preamble period; and
a channel matching filter, with the tap weights based on the estimated CIR, for optimally collecting a multipath energy for the received CCK symbols before the CCK demodulator during the CCK data period.

3. The CCK demodulator of claim 1, wherein the decoding means comprises:
mapping means coupled to receive the output of the multipath interference estimation mean for permuting and storing the output of the multipath interference estimation mean.

4. The CCK demodulator of claim 3, wherein the mapping mean comprises:
means to further reduce the computating number of post-correlation ICI bias (from 256 to 32 or 16), or equivalently, the number of active basic FMWT blocks needed for obtaining the post-correlation ICI biases for all the CCK codewords.

5. A method for computing the post-correlation Intra-Codeword Chip Interference (ICI) bias of a received symbol, the method comprising:
utilizing the auto-correlation properties of the codewords with multiple symbols in a reduced-complexity demodulator;
wherein the reduced-complexity demodulator, in the absence of multipath, contains a Fast Transform (Walsh, Hadamard, or Fourier) based correlator to operate in two modes at different times;
in a first mode the modified Fast Transform based correlator is a multipath interference cipher that receives feedback tap weights and feed-forward tap weights, and jointly calculates a plurality of post-correlation ICI bais; and
in a second mode the modified FWT based correlator is a correlator that receives chips of the received symbol and calculates the correlations between the received chips and a plurality of codewords of the received symbol.

* * * * *